March 30, 1937. R. K. STOUT 2,075,068
ILLUMINATING MEANS FOR INDICATING INSTRUMENTS
Filed Jan. 6, 1933 2 Sheets-Sheet 1
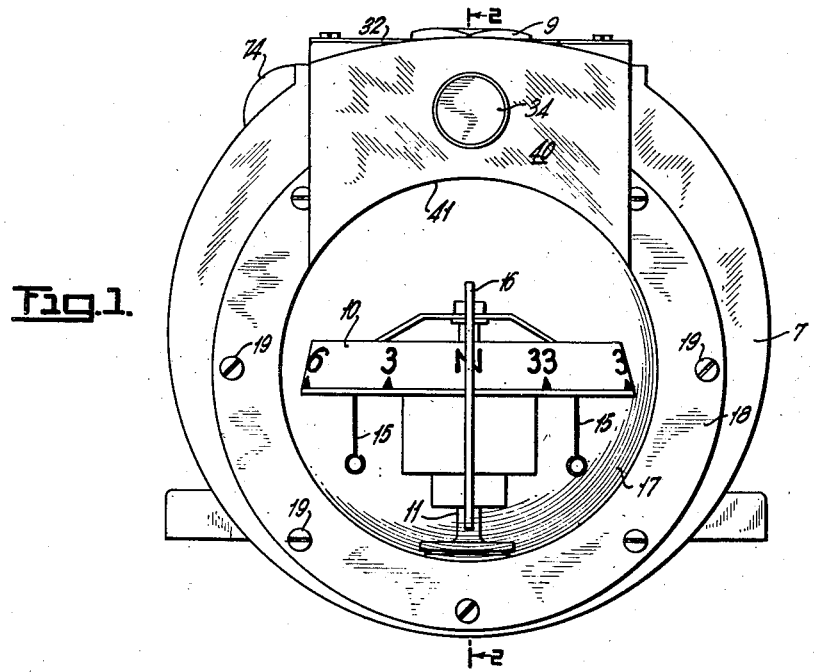
INVENTOR.
RAYMOND K. STOUT.
BY Stephen Cerstvik
ATTORNEY March 30, 1937.　　　R. K. STOUT　　　2,075,068
ILLUMINATING MEANS FOR INDICATING INSTRUMENTS
Filed Jan. 6, 1933　　　2 Sheets-Sheet 2
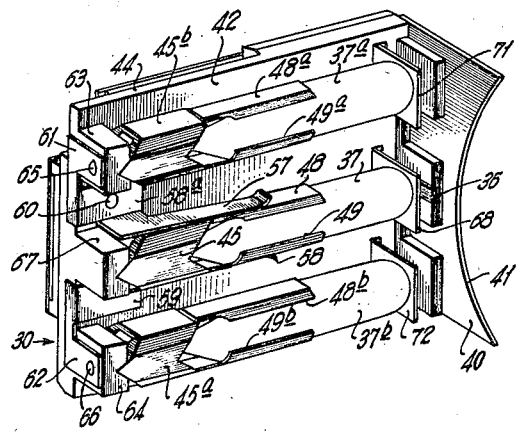
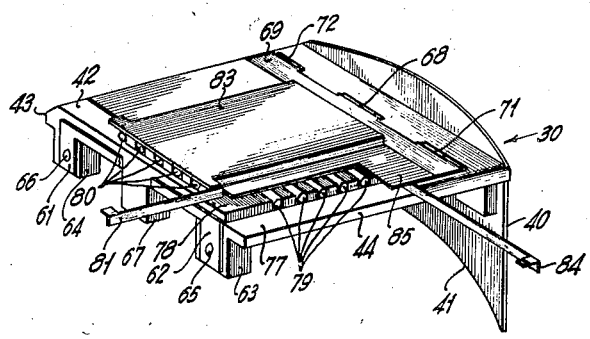
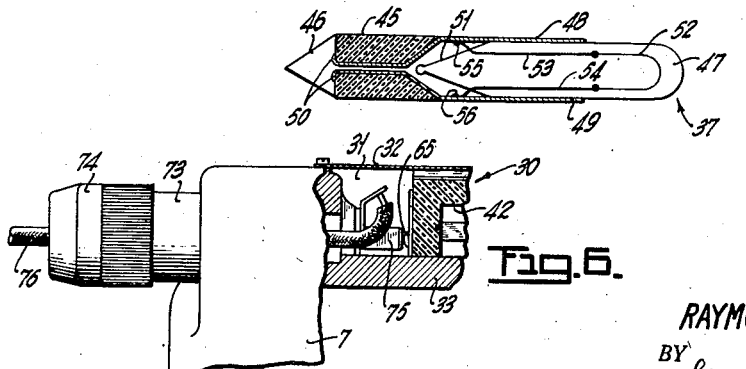
INVENTOR.
RAYMOND K. STOUT.
BY Stephen Cerstvik.
ATTORNEY.

Patented Mar. 30, 1937

2,075,068

UNITED STATES PATENT OFFICE 2,075,068

ILLUMINATING MEANS FOR INDICATING INSTRUMENTS

Raymond K. Stout, Dayton, Ohio

Application January 6, 1933, Serial No. 650,520

12 Claims. (Cl. 240—2)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to indicating instruments and more particularly to illuminating means therefor.

One of the objects of the invention is to provide novel removable means for indirectly illuminating dials of instruments whereby the casting of stray light to the front of the instrument and/or of a panel on which it may be mounted is prevented.

Another object of the invention is to provide, in an indicating instrument, a novel structure for the illumination thereof whereby the illuminating means, such as a lamp, may be easily and readily removed and/or replaced without necessitating the taking apart of any elements of the instrument or its casing.

Another object is to provide, in an indicating instrument, a novel illuminating structure adapted to form a part of the casing when it is in operating position with respect thereto and embodying a removable support whereby reserve or spare lamps may be carried thereon in such a manner that they may be quickly and easily adapted to replace the operating lamp when the latter burns out, without removing the instrument from its location.

A further object is to provide a novel illuminating structure for indicating instruments and embodying a removable member or drawer whereby reserve or spare lamps, in addition to the operating lamp, may be carried thereon, and also providing sufficient space for carrying other elements of the instrument necessary to its operation.

A still further object of the invention is to provide a novel illuminating structure for indicating instruments such, for example, as magnetic compasses, and embodying a removable compartment or drawer forming a part of the compass casing or bowl when inserted in operative position whereby reserve or spare lamps, in addition to the one in operation, may be carried therein, and also providing a removable support for a plurality of angularly disposed sets of bar magnets for compensating the compass for magnetic deviation.

Another object is to provide a novel illuminating structure for indicating instruments and embodying a removable compartment or drawer adapted to be slidable within the instrument casing and forming a part thereof when inserted in operative position whereby reserve or spare lamps, in addition to the one in operation, may be carried therein, and whereby, upon insertion of the compartment or drawer into the instrument casing, the effective lamp is automatically placed in circuit with its energizing source.

Still another object of the invention is to provide a novel illuminating structure for indicating instruments, particularly of the panel type, and embodying a removable compartment or drawer having electrical contacts thereon and adapted to carry reserve lamps, in addition to the one in operation, whereby upon insertion or withdrawal of the drawer the contacts are adapted to be engaged and disengaged with contacts provided in the casing to close and open the energizing circuit of the effective lamp.

The above and other objects and advantages of the invention will appear more fully hereinafter from a consideration of the detailed description which follows, when taken in connection with the accompanying drawings wherein one embodiment of the invention is illustrated. It is to be expressly understood, however, that the drawings are for the purpose of illustration and description only and are not designed or to be considered as defining the limits of the invention, reference being had to the appended claims for this purpose.

In the drawings, wherein like reference characters refer to like parts throughout the several views;

Fig. 1 is a front view of one form of indicating instrument embodying the present invention;

Fig. 2 is a longitudinal section taken on line 2—2 of Fig. 1;

Fig. 3 is a perspective view, looking from the side, of one form of removable drawer embodying the present invention;

Fig. 4 is another perspective view turned upward 90° of the view shown in Fig. 3;

Fig. 5 is a detailed view, partly in section, of a form of lamp used in carrying out the invention; and Fig. 6 is a partial view of the instrument casing and of the drawer, partly in section, showing the manner in which the energizing circuit of the effective lamp is closed when the drawer is inserted into the casing.

The invention comprises an illuminating structure for instruments and is in the form of a removable compartment or drawer provided with electrical contacts and arranged to carry a plurality of lamps thereon, one of which is clamped into electrical engagement with said contacts, thereby causing energization of the lamp upon insertion of the drawer into the casing of the instrument to be illuminated, and the others of said lamps are also clamped to the drawer, but not in engagement with the contacts and serving as reserve lamps or spares. The instrument casing is also provided with contacts which connect with and are adapted to be engaged by the drawer contacts, the former being connected to a suitable source of electric energy such, for example, as a battery. Provision is also made for carrying other elements of the instrument on such drawer, as will appear hereinafter, thus making for unity and compactness and improving the appearance of the instrument.

For purposes of illustration, the invention has been shown herein as adapted to a magnetic compass of the liquid type for illumination of the compass card and lubber's mark thereof and which may be mounted on a suitable vibrationless support (not shown) for attachment to an instrument panel, particularly when the compass is to be employed on an aircraft. In this instance the removable compartment or drawer, therefore, is arranged to carry two sets of bar magnets as the other elements of the instrument, in addition to the lamps, one set of said magnets being at right angles to the other set for compensating the compass for semi-circular deviation in a manner well known in the compass art. It is to be understood, however, that the invention is not limited in its application merely to a compass, but may be employed with any type of indicating instrument, the indicating elements of which it is desired to illuminate without casting stray light in front of the instrument and/or of a panel in which it may be mounted.

Referring now to the drawings, and more particularly to Figs. 1 and 2, the compass to which the invention has been applied comprises, as shown, a compass bowl or casing 7 which is adapted to be filled with a suitable damping liquid through a filling opening 8, the latter being arranged to be closed by a threaded plug or cap 9. Within the bowl 7 and nearer the front end thereof, a compass card 10 is pivotally mounted on a pivot post 11 in any suitable manner known in the art, the pivot post being secured to the bottom of the bowl as, for example, by means of a nut 12 engaging a threaded member 13 which extends through the bottom of the bowl into a recess 13a provided therein and to which is secured the pivot post 13 or, if desired, the pivot post may be formed integrally with the member 13. A pair of magnetic needles 14 are suspended from the compass card structure by means of carriers or holders 15, thereby causing the card 10 to swing on the pivot post 11 until the needles align themselves parallel to the magnetic meridian. A lubber's mark 16 is secured to the pivot post 11 and extends outwardly from the latter and projects upwardly in front of the compass card to cooperate therewith in indicating the compass direction. The compass card and the lubber's mark are adapted to be viewed through a suitable cover-glass 17 which is preferably in the form of a concavo-convex spherical lens so that the card indicia may be magnified, said cover-glass being secured to the compass bowl in any suitable manner as, for example, by a holding ring 18 and a plurality of circumferentially-spaced screws 19 extending through the ring and engaging the compass bowl (Fig. 1).

A sylphon 20 is provided within the compass bowl for compensating for the expansion and contraction of the damping liquid in the compass bowl due to changes in temperature, and is secured to the rear wall of the bowl in any suitable manner, as by means of a bolt 21 and a nut 22, the interior of the sylphon being in communication with the atmosphere exterior of the bowl through a passage 23 provided centrally and longitudinally of the bowl 21.

In order to prevent disturbance of the compass card by entrapped air in the form of bubbles, the interior of the bowl 7 is divided into a rear compartment 24 and a forward compartment 25 by means of a shield 26 which is in the form of a segment of a hollow sphere and is secured to a bracket 27 carried by the bolt 21. The size of the shield 26 is slightly less than the internal diameter of the bowl 7 in order to provide a restricted annular passage 28 between the rear compartment 24 containing the sylphon 20 and the front compartment 25 containing the compass card 10. A recess 29 is provided in the sylphon section of the bowl at the upper end thereof and near the filling opening to form a trap for air bubbles which may be in the liquid.

Novel means are now provided for illuminating the compass card 10 and lubber's mark 16 from the exterior of the compartment 25 and without introducing the light through the cover-glass 17. In the form shown, said means comprise a compact structure in the form of a removable compartment or drawer indicated generally at 30 in Fig. 2, and in more detail in Figs. 3 and 4 of the drawings, said drawer being adapted to be inserted within and withdrawn from a space 31 formed by a cover-plate 32 and suitable side plates (not shown) provided on either side of the cover-plate 32, together with a top 33 of the compass bowl 7. The walls defining the space 31 may, of course, be formed integrally with the instrument case instead of as separate walls secured to the case, without departing from the spirit and scope of the invention and, therefore, the removable compartment or drawer will be referred to and claimed as constituting a part of the casing when inserted therein. A rotatable knob 34 is provided at the front end of the drawer for inserting and removing the latter into and from the space 31 and for locking it therein when in inserted position, for which purpose a shank 35 of the knob 34 extends into the drawer and is provided with a finger 36 which is adapted, upon rotation of the knob 34, to fall within a slot provided in the retaining ring 18.

Within the removable compartment or drawer 30 there is secured a suitable electric lamp 37 which is adapted to be energized upon insertion of the drawer within the space 31, as will appear more fully hereinafter. The lamp 37 is so positioned within the compartment or drawer 30 that when the latter is completely within its casing it is just over a tubular opening 38 which is provided in the top 33 of the compass bowl 7 and which may be closed by a member 39 of some suitable transparent material such as glass, in order to direct the passage of light into the bowl to illuminate the compass card and the lubber's mark without permitting the escape of any liquid out of the bowl in accordance with the invention disclosed in the Patent 1,873,684 issued to Adolf Urfer on August 23, 1932 or, if desired, there may be inserted within the opening 38 a cylindrical glass member or rod in order to direct the light more efficiently through the liquid and onto the compass card than is possible with the tubular opening 38. This latter feature, however, forms no specific part of the present invention and any suitable means known in the art may be provided for introducing the light from the lamp 37 into the compass card compartment 25 of the compass bowl 7.

Referring now more particularly to Figs. 3 and 4 of the drawings, the removable compartment or drawer 30 is constituted, in the form shown, by a front plate 40, the bottom of which is curved, as indicated at 41, in order to fall flush with the exterior curved surface of the cover-glass 17 when the drawer is inserted within the casing. Carried by the front cover-plate 40 is a table or support 42 of some suitable insulating material such as a phenol-condensation product or hard rubber and which extends horizontally at right angles from said cover-plate 40. The edges 43 and 44 of the table or support 42 are adapted to slide within grooves (not shown) provided within the sides of the chamber 31. On the underside of the table or support 42, as shown in Fig. 4, is carried the lamp 37 which is constituted by a base 45 of suitable insulating material and one end of which is wedge-shaped as indicated at 46, and at the other end of which an evacuated glass vessel 47 is positioned within and cemented to a pair of contact strips 48 and 49, the latter passing through the base 45 and being secured thereto, as shown at 50. The glass vessel 47 is tapered at its inner end, as indicated at 51, and contains a suitable filament 52 which is carried by rigid supporting conductors 53 and 54, respectively, the latter of which extend through the tapered wall 51 of the vessel 47 and are connected to the contact strips 48 and 49, respectively, in any suitable manner as by soldering, as indicated at 55 and 56 (Fig. 5). The lamp 37 is adapted to be clamped between a pair of resilient contact strips 57 and 58 preferably formed integrally with portions 58a and 59, respectively, which are in a plane perpendicular to the planes of said contact strips 57 and 58 and are secured to the underside of the table 42 in a suitable manner as by means of rivets, one of which is shown at 60. Further extensions of the portions 58a and 59 are provided as shown at 61 and 62, respectively, the latter extensions being in planes mutually perpendicular to the plane of the portions 58a and 59 and the planes of the contact strip 57 and 58, said portions 61 and 62 being in turn secured to posts 63 and 64 by means of rivets 65 and 66, respectively, which form a pair of contacts and which are adapted to engage corresponding contacts provided on the compass bowl, as will later appear with reference to Fig. 6, in order to energize the filament 52 of the lamp 37. The wedge-shaped base 45 is adapted for insertion into a V-shaped groove provided in a third post 67 and when so inserted the lamp is held therein, and prevented from being dislodged therefrom, by means of a resilient engaging member 68 which projects through the table or support 42 at right angles to the longitudinal axis of the lamp, said member 68 being part of a metal strip 69 secured to the upper side of the table 42, as shown in Fig. 3, and providing a stop or abutment 70 (Fig. 2) for another purpose. The strip 69 is provided with two other resilient portions 71 and 72 which also project through the table or support 42 and are in the same plane with the member 68 in order to provide a resilient clamping means for a number of reserve or spare lamps 37a and 37b, respectively, the bases 45a and 45b of which are similar to the base 45 of the lamp 37 and are adapted for insertion into V-shaped grooves provided in the posts 63 and 64, respectively, but the respective contact strips of which are in no way electrically connected to the contacts 65 and 66.

Referring now to Fig. 6, there is provided at the left side of the compass bowl, as viewed from the front of the compass bowl in Fig. 1, an electric socket 73 into which is adapted to be inserted a plug 74 of the usual type. The socket 73 is connected to a pair of contacts, one of which is shown at 75, and the other (not shown) of which is on the opposite side of the compass. Said contact 75 and its associated other contact being adapted to be engaged by the contacts 65 and 66, respectively, of the removable drawer when the latter is inserted into the chamber 31 of the casing 7. The plug 74 may be connected to a suitable source of electrical energy such as a battery (not shown) by means of a cable 76. It will thus be seen that when the drawer 30 is inserted within its casing, electrical contact is immediately made and the circuit including the source of energy and the lamp 37 is closed so that the lamp thereby becomes energized and illuminates the compass card 10 through the tubular opening 38 and window 39. In the event that lamp 37 burns out, all that is necessary is to pull out the drawer 30, remove the lamp 37 and substitute one of the lamps 37a or 37b in lieu thereof, and insert the drawer back into the casing, thus placing a new lamp in circuit with the source of energy.

Means are also provided whereby the drawer 30 may be made to carry additional elements of the instrument necessary to the operation of the latter as shown, for example, in the illustrated embodiment, for carrying the compensating magnets of the compass and, in the form shown, said means comprising a pair of shelves 77 and 78 formed on the support 42 and arranged one above the other. On said shelves are carried two sets of bar magnets 79 and 80, respectively, the set 80 being above the set 79 and at right angles to the latter, i. e., the set 80 being for compensating the compass in the north-south direction and the other set 79 being for compensating the compass in the east-west direction. The magnets 80 abut against the stop 70 (Fig. 2) provided by the plate 69 and are prevented from being dislodged from their positions by means of a closure member 81 hinged on the shelf 78 and on a plate 83 which forms a cover for said magnets 80. A similar closure member 84 is provided for the magnets 79 which is hinged between the shelf 77 and an extension 85 of the plate 83, said extension being slightly offset from the plane of the plate 83, as shown in Fig. 3.

There is thus provided a novel removable structure adapted for use in illuminating the interior of indicating instruments, particularly the dials thereof, whereby reserve or spare lamps may be carried thereon in addition to the operating lamp and whereby said operating lamp is energized upon insertion of the structure within the casing of the instrument. The structure is also capable of carrying other auxiliary elements of the instrument such, for example, as the compensating magnets when the structure is adapted to a magnetic compass, thereby providing a unitary and compact assemblage which affords ready removal and/or replacement of the elements carried thereby.

Although only one embodiment of the invention has been illustrated and described, various changes, which will now appear to those skilled in the art, may be made in the form and relative arrangement of the various parts without departing from the spirit and scope of the invention. Reference is, therefore, to be had to the appended claims for a definition of the limits of said invention.

What is claimed is:

1. In an indicating instrument having a casing provided with an auxiliary compartment adjacent thereto, a dial in said casing, means for illuminating said dial and comprising electrical contact means within said auxiliary compartment and adapted to be connected to a source of energy, a removable support also having contact means thereon adapted to engage the contact means of the compartment upon insertion of the support within said compartment, a lamp carried by said support connected to the contact means thereof so that said lamp becomes illuminated upon engagement of the contact means of the compartment and the support, and means for passing light from the lamp to the interior of the casing to illuminate the dial when the support is within the compartment.

2. In an indicating instrument having a casing provided with an auxiliary compartment indicating elements in said casing, means for introducing light to the interior of the casing for illuminating the indicating elements, said means including a removable support adapted to be inserted into the auxiliary compartment and having an electric lamp thereon and secured thereto which is arranged to be connected to an energizing circuit upon insertion of the support within the compartment.

3. In an indicating instrument including a casing provided with an auxiliary compartment adjacent thereto, a dial in said casing, means for illuminating said dial, said means comprising a window between said casing and said compartment, a removable drawer adapted to be inserted into the auxiliary compartment, a plurality of lamps carried by said drawer, one of said lamps being positioned thereon to pass light into the interior of the casing through said window when the drawer is within said compartment, electrical contact means within the compartment and adapted to be connected to a source of electrical energy, and other electrical contact means on the drawer and associated with the operating lamp so that the latter is connected to an energizing circuit upon engagement of the two contact means when the drawer is within the compartment.

4. In a compass including a compass bowl having a compass card therein and having an auxiliary compartment adjacent thereto, means for introducing light into the bowl for illuminating the compass card and comprising a removable support slidable within said compartment, a lamp removably mounted on said member and removable therewith, electrical contact means associated with said compartment and said removable member for connecting said lamp to an energizing circuit upon sliding of the member into position within said compartment, and means for passing the light from the lamp to the interior of the bowl.

5. In a compass including a compass bowl containing a liquid and a compass card therein, and having an auxiliary compartment adjacent the bowl, means for introducing light into the compass bowl for illuminating the card, said means comprising a removable drawer adapted to be inserted into the auxiliary compartment and having a lamp mounted thereon and removable therewith and arranged to be connected to an energizing circuit upon insertion of said drawer into said compartment, and means between said bowl and said compartment for passing light from the lamp to the interior of the bowl while preventing the passage of the liquid from the bowl.

6. In an indicating instrument including a casing and means forming an auxiliary compartment having an opening at the front of the casing, indicating elements in said casing, and means for introducing light into the interior of the casing for illuminating said indicating elements, said means including a removable supporting means adapted to be inserted into said auxiliary compartment and constituted by a closure member having lamp-carrying means projecting therefrom in a direction substantially at right angles to the plane of said closure member and an electric lamp carried by said lamp-carrying means whereby, upon insertion of the supporting means into said auxiliary compartment, said lamp is inserted therewith and said closure member closes the opening of said compartment, and means in said compartment for connecting said lamp to an energizing circuit.

7. In an indicating instrument including a casing adapted for mounting on an instrument panel, said casing having indicating means therein and a front opening closed by a cover glass through which said indicating means may be viewed when the instrument is mounted on the panel, means for illuminating said indicating means from the exterior of the casing, said illuminating means including a detachable lamp-carrying member adapted to be secured to the instrument from the front thereof and above the cover glass, a lamp carried by said member and projecting rearwardly of the front face of the instrument, and cooperating separable contact means on the instrument and on said lamp-carrying member, respectively, and adapted to be engaged when said lamp-carrying member is secured to said instrument whereby said lamp is automatically connected into an energizing circuit.

8. In an indicating instrument including a casing adapted for mounting on an instrument panel, said casing having indicating means therein and a front opening closed by a cover glass through which said indicating means may be viewed when the instrument is mounted on the panel, means for illuminating said indicating means from the exterior of the casing, said illuminating means including a detachable lamp-carrying member adapted to be secured to the instrument from the front thereof and above the cover glass, a lamp carried by said member and projecting rearwardly of the front face of the instrument, cooperating separable contact means on the instrument and on said lamp-carrying member, respectively, and adapted to be engaged when said lamp-carrying member is secured to said instrument whereby said lamp is automatically connected into an energizing circuit, and a plug and socket device at the rear of the instrument and electrically connected to the contact means carried by the instrument for connecting said contact means to a source of electric current.

9. In a magnetic compass of the liquid type including a compass bowl adapted for mounting on an instrument panel, said compass bowl having a compass card therein and a front opening closed by a cover glass through which the card is visible when the compass is mounted on the panel, means for illuminating said card from the exterior of the bowl, said illuminating means including a detachable lamp-carrying member adapted to be secured to and detached from the compass from the front thereof and above the cover glass when the compass is on the panel, a lamp detachably carried by said member, and cooperating separable contact means carried by said bowl and by said lamp-carrying member, respectively, and adapted to be engaged when said lamp-carrying member is secured to the compass whereby said lamp is automatically connected into an energizing circuit.

10. In a magnetic compass of the liquid type including a compass bowl adapted for mounting on an instrument panel, said compass bowl having a compass card therein and a front opening closed by a cover glass through which the card is visible when the compass is mounted on the panel, means for illuminating said card from the exterior of the bowl, said illuminating means including a detachable lamp-carrying member adapted to be secured to and detached from the compass from the front thereof and above the cover glass when the compass is on the panel, a lamp detachably carried by said member, cooperating separable contact means carried by said bowl and by said lamp-carrying member, respectively, and adapted to be engaged when said lamp-carrying member is secured to the compass whereby said lamp is automatically connected into an energizing circuit, and a plug and socket device at the rear of the compass and electrically connected to the contact means carried by the compass for connecting said contact means to a source of electric current.

11. In an indicating instrument including a casing adapted for mounting on an instrument panel, said casing having indicating means therein and a front opening closed by a cover glass through which said indicating means may be viewed when the instrument is mounted on the panel, means for illuminating said indicating means including a detachable lamp-carrying member adapted to be secured to the instrument from the front thereof, a lamp carried by said member and projecting rearwardly of the front face of the instrument when said member is secured to the instrument, and cooperating contact means on the instrument and on said lamp-carrying member, respectively, and adapted to be engaged when said lamp-carrying member is secured to said instrument, whereby said lamp is automatically connected into an energizing circuit.

12. In an indicating instrument including a casing adapted for mounting on an instrument panel, said casing having indicating means therein and a front opening closed by a cover glass through which said indicating means may be viewed when the instrument is mounted on the panel, means for illuminating said indicating means and including a detachable lamp-carrying member adapted to be secured to the instrument from the front thereof and adjacent the periphery of the cover glass, a lamp carried by said member and projecting rearwardly of the front face of the instrument, and cooperating contact means on the instrument and on said lamp-carrying member, respectively, and adapted to be engaged when said lamp-carrying member is secured to said instrument, whereby said lamp is automatically connected into an energizing circuit.

RAYMOND K. STOUT.